No. 610,330. Patented Sept. 6, 1898.
J. B. RENSHAW.
CUTTING-OFF APPARATUS.
(Application filed July 7, 1897.)
(No Model.) 5 Sheets—Sheet 1.

Witnesses:
H. Mallner
F. A. Clemons

Inventor
Joseph B. Renshaw
By his Attorney
W. H. Honiss.

No. 610,330. Patented Sept. 6, 1898.
J. B. RENSHAW.
CUTTING-OFF APPARATUS.
(Application filed July 7, 1897.)
(No Model.) 5 Sheets—Sheet 3.

Witnesses:
H. Mallner
F. A. Clemons

Inventor
Joseph B. Renshaw
By his Attorney
W. H. Honiss.

No. 610,330. Patented Sept. 6, 1898.
J. B. RENSHAW.
CUTTING-OFF APPARATUS.
(Application filed July 7, 1897.)
(No Model.) 5 Sheets—Sheet 4.

Witnesses:
H. Mallner
F. A. Clemons

Inventor
Joseph B. Renshaw
By his Attorney
W. H. Honiss.

UNITED STATES PATENT OFFICE.

JOSEPH B. RENSHAW, OF HARTFORD, CONNECTICUT.

CUTTING-OFF APPARATUS.

SPECIFICATION forming part of Letters Patent No. 610,330, dated September 6, 1898.

Application filed July 7, 1897. Serial No. 643,713. (No model.)

*To all whom it may concern:*

Be it known that I, JOSEPH B. RENSHAW, a citizen of the United States, residing at Hartford, in the county of Hartford and State of Connecticut, have invented certain new and useful Improvements in Cutting-Off Apparatus, of which the following is a full, clear, and exact specification.

This invention relates to improved means for cutting off metallic rods, bars, tubing, and similar articles, my object being primarily to provide a light, compact, and effective device which may be packed in small compass for transportation, be quickly and easily applied upon the work, and be operated either by hand or by any available motive power, as may be most convenient.

This device is intended for use in cutting off stationary or non-rotating bars or rods; and an important object of this invention is to provide means for automatically feeding the cutting-tool to its work by a movement derived directly from the means employed for revolving it around the work, thereby insuring that the feed of the tool to its cut shall bear a uniform and constant relation to its speed of revolution. The desired feeding movement is obtained in my present invention by a very simple and direct system of differential gears.

A further purpose of my invention is served in the mode of attaching certain of these differential gears to the members which they respectively drive, so that the strains arising from their correlated operation serves to tighten each of them more firmly in place, while permitting each of them to be readily detached from its member when desired.

A further object of my invention is to provide means for resisting the tendency of the bolt to turn with the cutting-tool, the means being modified according to the environment in which the apparatus is used and depending also upon whether the apparatus is driven by hand or by power. Other features of the present invention reside in the construction and arrangement of the various details of the apparatus, as will be hereinafter more fully set forth.

Although this device may in its many possible modifications be employed for the cutting off of plain bars or tubes of metal, it is herein particularly shown and described as applied to cutting off in position the stay-bolts commonly employed for bracing the plates of steam-boilers, this being considered by me to be its most useful and valuable embodiment and use, the apparatus being especially adapted to meet several difficulties and requirements peculiar to its environment and use in this class of work. Among these may be mentioned the cramped or contracted space in which it must frequently and usually be employed, the tendency of the stay-bolt to rotate with the cutting-tool, the desirability of cutting off the bolt, so as to leave a flat end at right angles to the axis of the bolt, and the necessity for having the ends of the bolts fit tightly in the plates and for leaving the threads thereof unbruised, so that each new end may readily be entered in the succeeding hole in the boiler-plate. These and many minor objects are accomplished by means of my present invention.

Fig. 4 of Sheet 2 is a side view in section taken on a plane passing through the axis of the apparatus, which is shown in operative position upon a stay-bolt, showing in connection with the latter two boiler-plates which are to be braced by it. Another stay-bolt in its completed condition is shown immediately below the bolt that is being cut off by the apparatus. The latter, as shown in this view, is adapted to be worked by hand. Fig. 4$^a$ shows a convenient method of extending the stay-bolt, so as to avoid wasting the ends. Figs. 13 and 14 of Sheet 2 represent two different modifications of my improved means for preventing the rotative movement of the bolt due to the cutting operation of the tool. The latter in order to coöperate with the means herein shown must be left-handed—that is to say, its direction of revolution must be opposite to that of the tools shown in the preceding figures.

This invention is herein shown as being embodied in a device for cutting off boiler stay-bolts for the reason that my experience in that class of work has shown many of the difficulties and inconveniences attendant upon the cutting off of these stay-bolts in actual practice, and in order that a full comprehension may be had of the functions to be performed and of the excellence with which this embodiment of my invention is adapted to perform those functions I will preface my description of the apparatus with a brief statement of the conditions to be met and the difficulties to be overcome as they have appeared to me.

Figures 10, 11, 12:
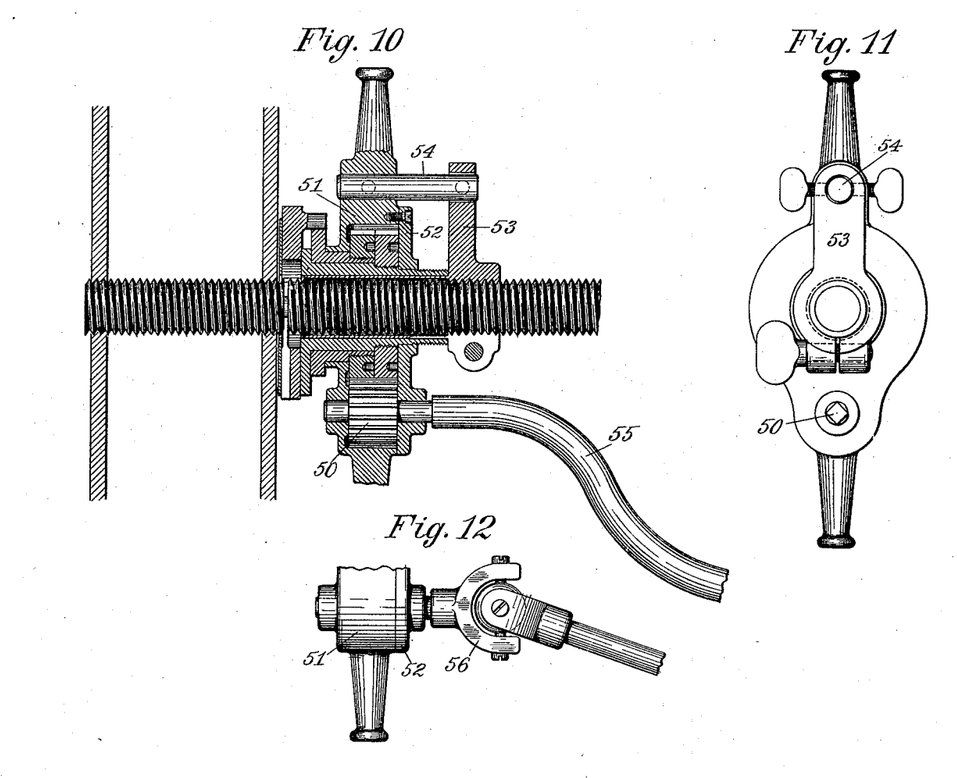
Fig. 10 of Sheet 4 is a side view of a modified form of my apparatus in section taken on a plane passing through the axis thereof, showing it arranged to be driven by mechanical power and showing also a modified arrangement for resisting the tendency of the cutting-tool to rotate the stay-bolt.
Fig. 11 is an end view of what is shown in Fig. 10.
Fig. 12 is a fragmentary side view showing a modified form of connection with the driving means.

The stay-bolts herein referred to are employed for staying or bracing adjacent flat plates of steam-boilers, thereby enabling those plates to reciprocally support each other, so as to resist the expansive force of the steam when the boiler is under pressure and to also resist the external collapsing pressure of the atmosphere when a partial vacuum is formed between the plates by the cooling of the boiler. A series of rows of holes are drilled or punched in those sections of the boiler-plates which are thus to be stayed, and those holes are tapped to receive the stay-bolts, one of which, as S, is shown in a completed condition in Fig. 4, the opposite ends being riveted over, so as to close the joints and make them steam and water tight. Theoretical perfection in this class of work is attained only by having the holes in one plate exactly opposite to the corresponding holes in the other plate, so that the stay-bolt shall stand exactly at right angles thereto by having the threads of the stay-bolt fit tightly in the threaded holes and by having the ends of the bolt cut off smoothly in a plane at right angles to its axis. It is then only necessary to lightly rivet down the projecting edges or rims of the bolt in order to make a secure, smooth, and perfect joint. This theoretical perfection or excellence is, however, seldom achieved in actual practice. The stay-bolts employed for this purpose are manufactured in the form of rods from two to four feet long, each of which is continuously threaded throughout its entire length. One end is squared to receive a wrench, by means of which the opposite end of the rod is screwed to place in the boiler-plates. The procedure now most commonly followed is to screw the leading end of the rod slightly beyond the surface of the inner plate, as shown in Fig. 10, and then to cut off the stay-bolt length at a similar distance from the nearer or outer plate by the primitive means of a hammer and cold-chisel. The repeated lateral blows of the hammer around the bolt tend to elongate or otherwise enlarge and distort the cylindrical form of the threaded hole in the comparatively thin plate, tending at the same time to swage or compress the corresponding portion of the bolt, so as to make it fit even more loosely than before. The action of the beveled faces of the cold-chisel tends also to bruise the threads and distort the original cylindrical form of the new end thus formed, so that it is difficult to make that new end enter the succeeding hole in the plates even when the rods are made appreciably below size, which is often done to meet this latter difficulty. It is then difficult for the workmen to expand the ends of such bolts uniformly and to a sufficient extent to make them solidly end evenly fill their respective seats in the plates. The practical result of this procedure is that unless the work is done under the most careful supervision and rigid inspection the stay-bolts are loosely and badly fitted, thereby endangering the safety of the boiler. It is also almost impossible to cut the stay-bolt squarely across with a cold-chisel or with shears, so that the resulting faces are plane and at right angles to the axis of the bolt, this being desirable in order that the bolt shall project from the plate an equal extent all around its circumference. Otherwise the joint between the bolt and the boiler-plate will not be equally closed at all portions of that circumference by the riveting operation, so as to present the smooth and perfect appearance of the riveted stay-bolt S of Fig. 4.

The apparatus of my present invention is devised to meet these conditions and requirements, avoiding all lateral blows and the ill effects thereof above set forth. It is adapted to cut off the stay-bolt by means of a revolving and cleanly-cutting tool like those employed for a similar purpose in the cutting-off machines or lathes commonly used in machine-shops. It comprises means for mounting and revolving this tool around the axis of the stay-bolt, for feeding it radially thereto, and for supporting the rotating portion of the apparatus concentrically with the rod without coming in contact with and wearing the threads of the latter.

This invention will now be fully described, commencing with the form adapted for use by hand. (Shown in Figs. 1 to 8, inclusive.)

The cutting-off tool 20 is clamped in the tool-slide 21 by means of the screws 22, the beveled portions of which bear against a correspondingly-beveled side of the tool, thus adjustably clamping it in position. The tool-slide 21 is fitted so as to be movable transversely in the tool-head 23, the parts being so arranged as to bring the plane of the cutting-tool 20 as near as possible to the end face of the tool-head in order that the cut, if desired, may be correspondingly close to the boiler-plate, as shown in Fig. 10. The tool-head is provided with a sleeve portion bored to allow the stay-bolt to pass through concentrically therewith.

As a means of rotating the tool-head by hand-power it has screwed or otherwise removably fastened upon the opposite end of its sleeve the arm-hub 24, in which are secured the arms or handles 25. These handles are preferably screwed to place in the hub 24, as shown in Fig. 4, in order that they may readily be removed for packing in closer compass.

Figures 6, 9:
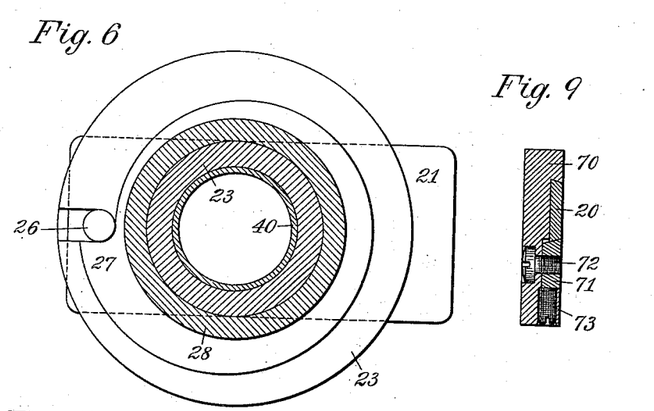
Fig. 6 is an end view in section taken on the line 6 6 of Fig. 1, showing the tool-slide and the cam by means of which that slide is fed radially to the axial line of the apparatus, so as to feed the tool into the work.
Fig. 9 is a sectional end view showing a modified method of clamping the tool.

The tool-slide 21 is provided with a projecting hub or pin 26, which engages with the outside of the flange 27 of the cam 28. That cam is rotatably journaled upon a cylindrical portion of the sleeve of the tool-head 23, and the outside of its flange 27, which bears against the tool-slide hub or pin 26, is of a scroll-like form, as shown in Fig. 6, so as to move the tool-slide transversely across the head as the cam is rotated relatively to the tool-head, thereby feeding the cutting edge of the tool radially toward the axis of the rotating tool-head.

Figures 4, 4A, 13, 14:
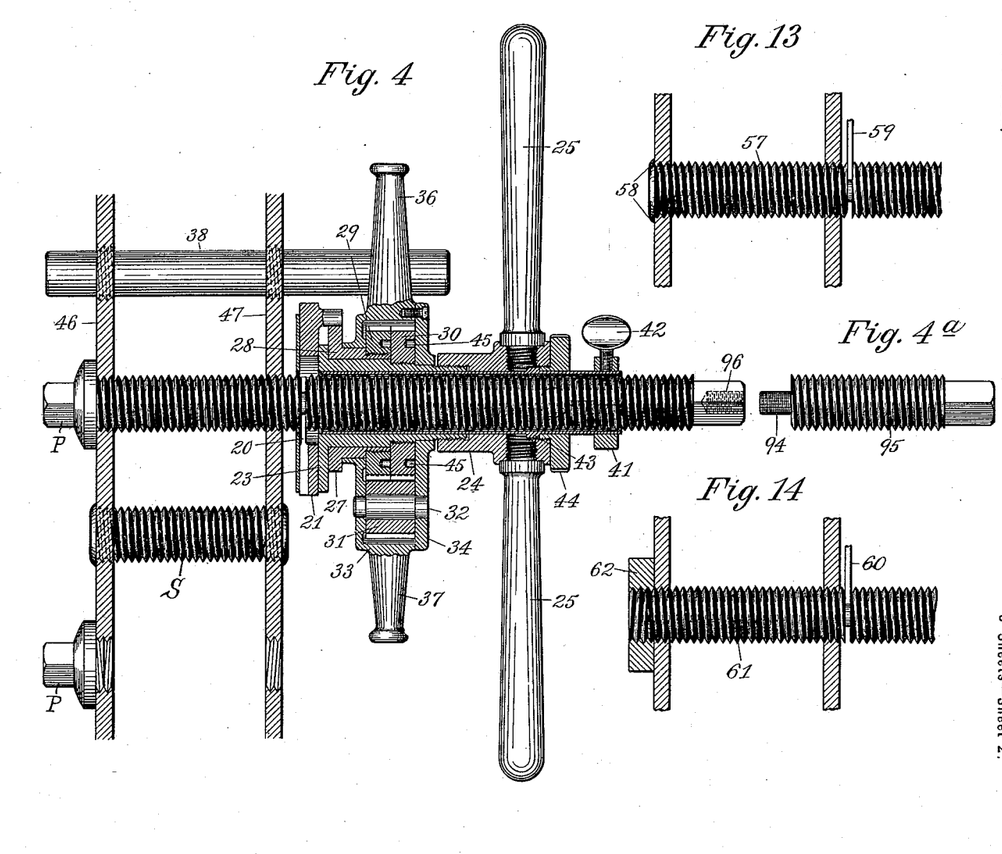
Figure 5:
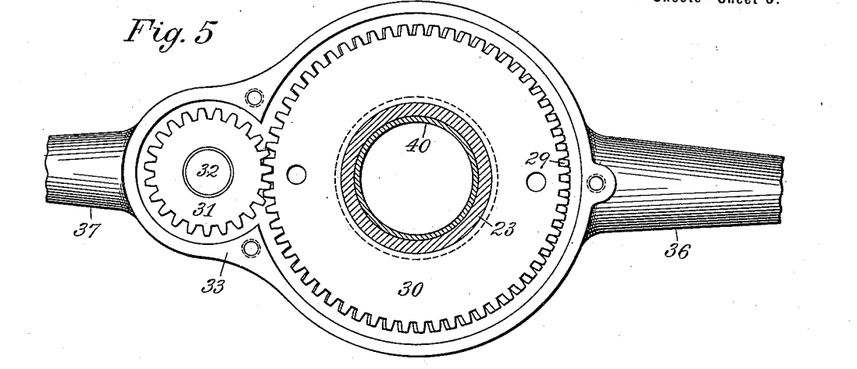
Fig. 5 of Sheet 3 is an end view in section taken on the line 5 5 of Fig. 1, showing the differential gearing by means of which the feeding movement of the tool is derived from its rotative movement.

The rotation of the cam 28 relative to the tool-head 23 is caused by means of the gear 29, fixed upon the cam, the gear 30, fixed upon the tool-head, and the planetary pinion 31, which in the embodiment of my invention shown in Fig. 4 is journaled upon the pin or stud 32, the latter being supported at one end in the gear-casing 33 and at the other end in the cover 34 of that casing. As shown in Fig. 5, the cam-gear 29 is provided with one tooth more than the number of teeth in the tool-head gear 30, and as both of these teeth are in mesh with the planetary pinion 31 it follows that at each rotation of the tool-head relative to the gear-casing 33 the differential movements of the gears will cause the cam 28 to rotate relatively to the tool-head to an angular extent equal to the angular separation of two of its own teeth, thus by means of the cam-flange 27 moving the tool-slide 21 transversely to the head and carrying the cutting-off tool 20 toward the axis of rotation to an extent equal to the feed required for its most efficient use.

Figure 2:
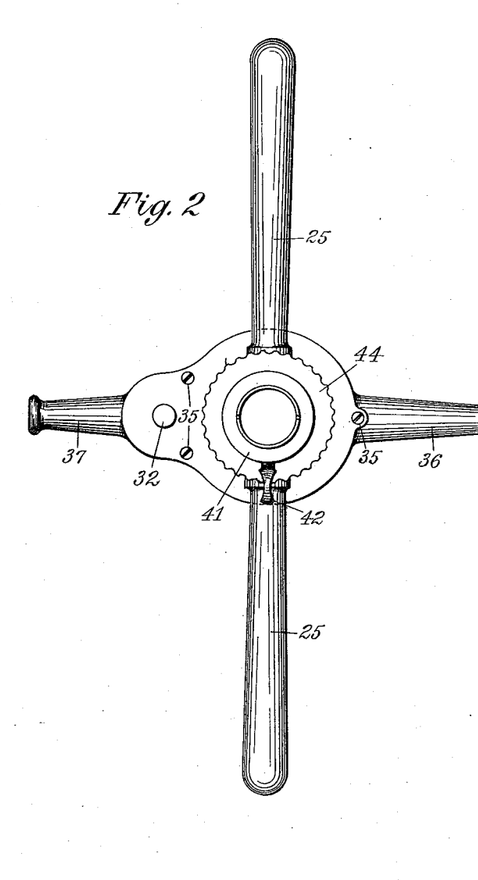

The gear-casing 33 is journaled upon any convenient portion of the apparatus, being herein shown to be mounted upon a cylindrical sleeve of the cam 28. The cover 34 of the casing is journaled upon a cylindrical portion of the head 23, being fastened to the casing by means of screws 35, arranged as best shown in Fig. 2. This casing is adapted to support the pinion 31, to inclose and protect all of the gearings, and also by means of the handles 36 37 to afford means for retaining the pinion in its desired position, so as to compel the rotation of the cam 28. The resistance offered by the work to the radial feeding movement of the cutting-tool tends, through the cam 28, its gear 29, and the pinion 31, to rotate the casing. Therefore in order to compel the tool to feed it is necessary to prevent the casing from rotating, and this when the device is used by hand, as shown in Fig. 4, is preferably effected by allowing it to rest against a rod 38, placed in one of the adjacent stay-bolt holes in the boiler-plates.

Figures 1, 3:
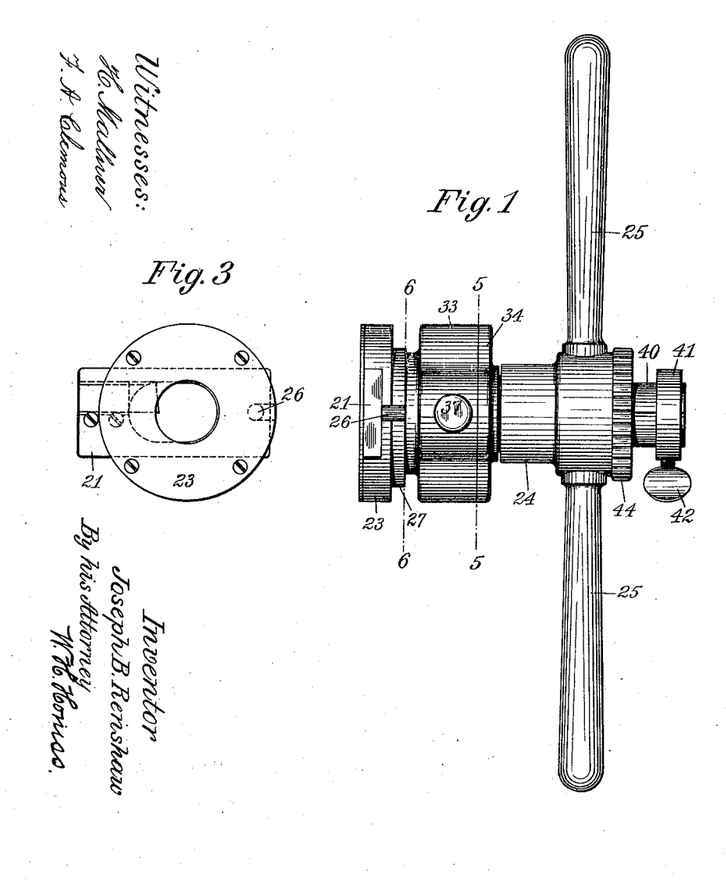
Figure 1 of Sheet 1 of the drawings is a side view, and Fig. 2 an end view, of the external appearance of my improved device as adapted to the cutting off of stay-bolts.
Fig. 3 is an end view projected from the left-hand end of Fig. 1, showing the tool-slide in its retracted position.

In order to adapt this apparatus to the cutting off of stay-bolts of different diameters, I make the central bore of the tool-head 23 somewhat larger than the largest stay-bolt used and provide a set of removable bushings 40, bored to the different sizes of stay-bolts, so as to slide freely over the threads thereof. These bushings are turned to a uniform outside diameter to receive the rotating tool-head 23, thus interposing bearings between that head and the threads of the non-rotating stay-bolts. Each of these bushings is split at its outer end, as shown in Figs. 1 and 4, and is provided with a collar 41 and thumb-screw 42, by means of which the split outer end of the bushing is clamped to the outer surface of the stay-bolt and held in a fixed relation thereto.

As a means for retaining the rotating tool-head in its desired position longitudinally of the stay-bolt the bushing 40 is provided with an annular enlargement or collar 43, fitting a correspondingly-counterbored seat in the hub 24, as shown in Fig. 4. A knurled hand-ring 44 is screwed into and against the outer side of the hub 24, the threaded projection extending into the counterbore and fitting loosely against the collar 43, thereby forming an end bearing for the tool-head.

As a means of securing the gears 29 and 30 to the cam and to the tool-head, respectively, they are provided with threads having such directions of lead that each gear will be screwed tightly against the shoulder of the part which it drives by the resistance of that part to the driving movement. In the apparatus shown in Fig. 4 the gear 30 is fitted upon its tool-head sleeve by means of a right-hand thread, since the resistance of the tool in cutting would thereby serve to tighten the gear against its shoulder of the sleeve. On the other hand, since the cam 28 must be driven in the opposite direction relatively to the tool-head, the gear 29 is secured thereto by a left-hand thread, the resistance of the cam to its driving movement thereby tending to tighten that gear also upon its thread against the shoulder of the cam-sleeve. It is desirable to have the sleeves of the tool-head and of the cam quite thin in order to avoid unnecessarily increasing the diameter of the apparatus, and it would therefore be difficult to secure them to their respective gears by means of keys or pins in the ordinary way. It is furthermore desirable to have these gears readily removable, which could not readily be done if keys or pins were used. By providing each of these gears with spanner-holes, as shown in Figs. 4 and 5, they may readily be attached to or detached from their respective sleeves.

The tendency of the cutting-tool to carry the stay-bolt with it in its rotative movement may be met in various ways, the choice of methods depending somewhat upon whether the apparatus is driven by hand or by power and depending also upon the environment in which the apparatus is employed. When operated by hand, as shown in Fig. 4, I prefer to employ a plug P, screwed into the tapped hole in the rearward plate 46 and extending half or two-thirds of the way through that plate. The leading end of the stay-bolt is then forced against the end of the plug, which thereby resists the rotative tendency of the stay-bolt under the strain of the cutting operation. When this plug is used, the stay-bolt must be cut off at a greater distance from the front plate 47, so that when the bolt is subsequently screwed to place its ends shall project suitable and equal distances from the plates.

A modified method of resisting the tendency of the stay-bolt to rotate with the cutting-tool is shown in Fig. 13. In employing this method the stay-bolt 57 is screwed to a proper distance beyond the rearward plate 46, and the end is then riveted over, as shown at 58, after which the cutting-off or cutting-down operation is performed by means of the tool 59. In the method illustrated in Fig. 14 the stay-bolt 61 is also screwed to its final position in the plates, so that its leading end projects slightly beyond the plate 46, when the check-nut 62 is screwed upon this projecting portion tightly against the plate, after which the cutting-off operation may be performed by means of the tool 60. In the employment of both of the methods illustrated in Fig. 13 and 14 it is preferable to employ what may be termed a "left-handed" apparatus, in which the tools 59 and 60 are turned toward the observer, thereby tending to rotate their respective bolts in the direction which would unscrew them from the plates if that tendency were not met by the riveted end of the stay-bolt 57 in Fig. 13 and by the check-nut 62 in Fig. 14, respectively.

In Figs. 10, 11 and 12 is shown a modified construction of my apparatus adapted to be driven by steam, electricity, or other convenient motive force. The arm-hub 24 and its handles 25 are here shown to be omitted, the power being applied direct to the planetary pinion 50, preferably integral with its bearings, which are journaled so as to rotate in the gear-casing 51 and its cover 52. The power derived from any convenient source is applied directly upon the end of the pinion-shaft, which may be squared, as shown in Fig. 11, or otherwise adapted to receive a flexible shaft 55, (shown in Fig. 10,) a universal-joint coupling 56, as shown in Fig. 12, or any other convenient medium of power transmission. In this modification the tendency of the cutting-tool to rotate the bolt is met by clamping or otherwise attaching a threaded dog 53 rigidly to the bolt, the dog engaging with a pin 54, attached to or integral with the gear-casing 51, thus sustaining that gear-casing, and consequently the axis of the driving-pinion 50, in a fixed relation to the bolt. The tendency of the tool to turn the bolt in one direction reacts in the opposite direction through the tool-head, the pinion, the gear-casing, and the dog 53 directly upon the bolt itself, thereby balancing the rotative cutting strain of the tool with a corresponding resistance on the part of the bolt by means wholly contained within the apparatus itself. It is evident, however, that the comparatively slight resistance of the tool to the inwardly-feeding operation of its cam is not thus balanced in the apparatus shown in Fig. 10, and it therefore has a slight tendency to rotate the bolt, so as to move it longitudinally toward the right or the left, according to the arrangement of the differential gears and the direction of rotation of the cutting-tool. If that movement is toward the left, it may be resisted by the use of the plug P. If toward the right, it may be resisted by the check-nut 62 of Fig. 14 or by the riveting 58 of Fig. 13. This tendency may also easily be met by the hands of the operator by grasping one or both of the handles 36 and 37, since in the power-driven apparatus of this figure the handles 25 of the hand apparatus shown in Fig. 4 are removed and are out of the way; or if the operator prefers he may prevent the turning tendency of the gear-casing 51, as illustrated in Fig. 4, by means of a rod 38. When, however, the rods 36 and 37 are held by the hands of the operator, it is possible for him to vary to a considerable degree the extent of the feed of the tool. By allowing the handles to slowly follow the direction of rotation of the tool-head the rapidity of feed may be lessened to any desired extent, while by rotating the gear-casing in the opposite direction the feed may be correspondingly increased.

Although the cam employed for feeding the cutting-tool may be and for some purposes preferably is so shaped as to carry the point of the tool exactly to the axis of the work, thereby completely severing the rod, it is for the purposes now under consideration considered preferable not to cut the bolt completely off, but to leave a neck of a diameter relative to that of the bolt substantially as shown in Figs. 4 and 10, having sufficient strength to support the apparatus and strong enough also to enable the bolt in the method shown in Fig. 4 to be screwed to its final position after the removal of the plug P and after the removal of the apparatus, when the bolt may readily be broken off at the neck by bending it once or twice in opposite directions. The projecting portions thus left upon the central portions of the end faces of the stay-bolt are not in the least objectionable. On the contrary, they facilitate the proper expansion of the ends of the bolt, the blows of a hammer upon this central portion tending to expand the ends, so as to make them fit more tightly in their threads in the plate, after which the final riveting around the edges of the bolt may be done.

In Fig. 9 is shown modified means for clamping the cutting-off tool 20 in position. The tool-slide 70 is recessed to receive the gib 71, which is held to its seat by screws 72 and is forced against the top of the cutting-off tool by means of the screw 73. The engaging edges of the tool 20 and of the gib 70 may, if desired, be slightly toothed or roughened, so as to hold the former more securely.

Figure 15:
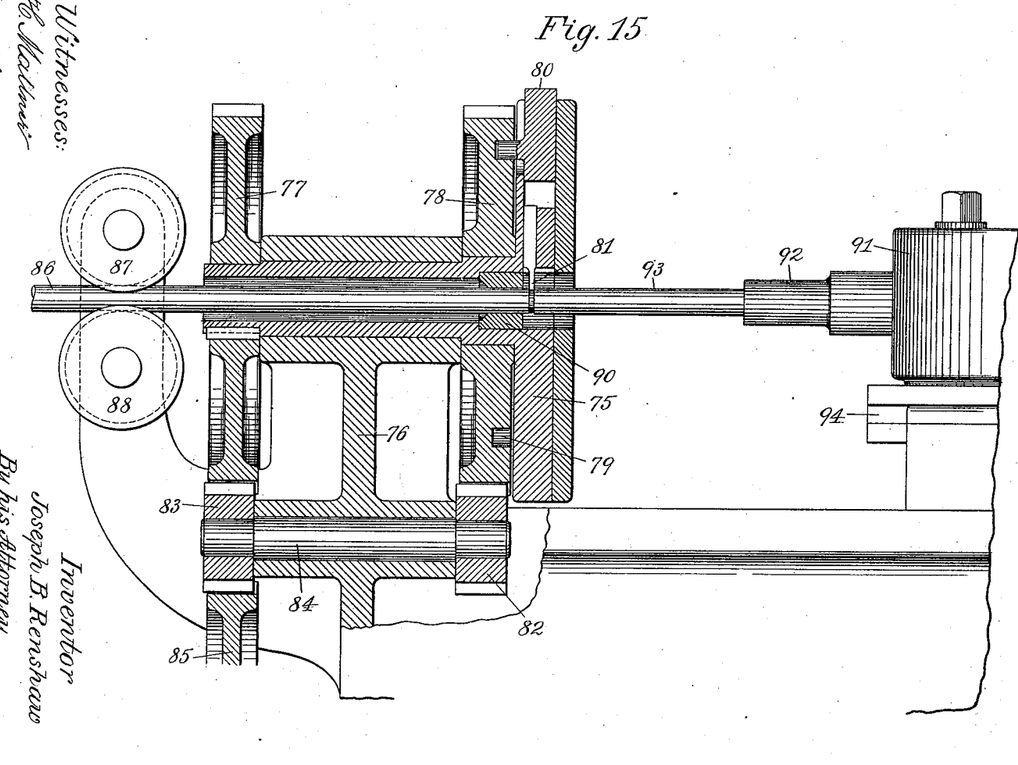
Fig. 15 of Sheet 5 is a side view, partly in section on a vertical plane through its axis, of a modified arrangement of my invention as applied to the cutting off of rods or bars of stock in conjunction with machines of the class employed for making screws, pins, rivets, and the like from rods of stock of indefinite length in which the stock is held against rotative movement and is intermittently fed longitudinally into the machine at suitable intervals by means of any of the well-known devices for that purpose.

Fig. 15 represents a modified form of my present invention, which may be used as a stationary cutting-off machine or as a cutting-off auxiliary to machines for making screws, pins, and similar parts in which the rod or wire-stock of indefinite length is fed into the machine by suitable devices which prevent it from rotating, but which feed it longitudinally to the desired extent and at the desired intervals. As represented in Fig. 15, the tool-head 75 is journaled to rotate in the frame 76 of the machine and has keyed or otherwise secured upon its left-hand end the gear 77. The gear 78 is journaled to rotate upon a cylindrical portion of the tool-head and is provided with a cam-groove 79, which engages with a projecting pin or hub of the tool-slide 80. The latter is fitted to slide radially in the rotating tool-head 75, under the control of the cam-groove 79, the tool 81 being in this case of the left-handed form already described.

The gear 78 and the gear 77 are positively connected by means of the pinions 82 83, fixed upon the shaft 84, which is also journaled in the frame 76. The pinion 83 is also connected by means of the gear 85 with the driving mechanism of the machine.

The rod 86 is herein shown as being supported by the rolls 87 and 88, which may be so geared or otherwise connected with the machine as to cause the rod to be fed into the machine at suitable intervals, or the rod may be fed in any one of the several ways already well understood and forming no part of the present invention. The end of the rod adjacent to the cutting-tool may be supported by means of a bushing 90, fixed in and rotating with the tool-head 75.

The gear 78 is provided with one tooth more or one tooth less, as the case may be, than the gear 77, so that at each rotation of the tool-head 75 the gear 78, with its cam-groove, is retarded or accelerated with relation to the rotating tool-head to the angular extent of the angular distance between two of its teeth. If it has one tooth more than the gear 77, the gear 78 will be relatively retarded. If it has one tooth less, it will be relatively advanced or accelerated to that extent at each of the rotations of the head 75, and the cam-groove 79 is so shaped as to advance the tool-slide toward the center, so as to feed the tool inwardly at a suitable rate. The cam-groove 79 may be shaped so as to give any desired rate or extent of feed to the tool, so as to form a groove of a desired depth or so as to cut it off altogether, after which the tool is withdrawn by its cam to allow a new length of stock to be fed forward.

The embodiment of my invention shown in Fig. 15 may be advantageously employed in connection with automatic screw-machines of the class which operate upon coils or indefinite lengths of wire, which is held from rotating and fed forward at suitable intervals, as above described. In the drawings is shown a turret 91, with its gaging-stop 92 in position for stopping the rod 86 at the desired position, so as to enable a predetermined length 93 to be cut therefrom. The devices which rotate the turret, so as to bring its grooved tools into operation upon the blank 93 and which feed those tools longitudinally to that blank by means of the slide 94, may be driven in the usual and well-known way by means of a longitudinal cam-shaft located beneath the bed of the machine and connected by means of gearing with the gear 85, so as to cause my improved cutting-off devices to work in suitable time and relation to the tool-carrying turret mechanism.

A brief description of the operation of the apparatus shown in Fig. 4 will now be given. The operator is located upon the outside of the boiler, while his assistant, provided with a number of the plugs P, is within the boiler on the left-hand side of the plate 46. The latter screws the plugs P into the tapped holes on his side of the plate 46, while the operator screws the leading end of the stay-bolt rod through the plates tightly against the plug P. The cutting-off apparatus is then pushed upon the rod to a suitable longitudinal position and secured thereon by means of the thumb-screw 42. Then, after placing the rod 38 in position, the tool-head is rotated by means of its handles 25 until the tool has cut its annular groove of the desired depth. The outer surface of the cam-flange 27 is preferably so formed as to make one complete rotation at each cutting-off operation, thereby bringing its lowest portion, at which the cut was started, again beneath the cam-pin 26, as shown in Fig. 6, thereby enabling the tool-slide to be pushed backward, so as to carry the point of the tool outside of the circle of the stay-bolt. The set-screw 42 is then loosened and the apparatus removed. The corresponding plug P is then unscrewed and removed, and the rod, by means of its squared end, is screwed along, so that the bolt to be detached stands in proper relation to the plates. The projecting portion is then broken off at the cut just made, the ends are expanded and riveted down, and the new end of the rod is screwed into the succeeding hole in the boiler-plate, when these operations are repeated.

The operation of the power-driven modification of my apparatus (shown in Fig. 10) varies from that already described in respect to the method of clamping the stay-bolt by means of a dog 53, means being provided for stopping and starting the power-driven devices in any of several well-known ways. In this connection it may be noted that there is no necessity of stopping the power at any exact point. On account of the peculiar form of the feeding-cam 28 the tool can only be fed to the proper predetermined depth in the work.

As a means of enabling the entire length of the stay-bolt rods to be cut into blanks with a minimum of waste at their final or squared ends I provide extensions, as shown in Fig. 4$^a$. Those squared ends of the rods, as shown in Fig. 4, are concentrically drilled and tapped to receive a correspondingly-threaded portion 94 of the extension-piece 95 of Fig. 4$^a$, which latter may itself be made from one of the aforesaid final ends of the stay-bolt rods. This extension, when screwed to place in the end of the stay-bolt, affords a bearing for my apparatus while cutting off the last available stay-bolt from the rod. The extension 95 may then be unscrewed from its seat in the end of the rod to be similarly used upon the subsequent rods.

The threaded portion 94 of the extension 95, when used in connection with the right-handed apparatus shown in Fig. 10, should be left-handed in order to enable the dog 53 when clamped upon that extension to properly resist the strain of the cutting-tool 20. If the threaded portion 94 were to be right-handed when used in connection with that apparatus, the effect of the cutting operation would be to unscrew the threaded portion 94 from the stay-bolt rod. A right-hand thread would, however, be required for use in connection with a left-handed apparatus.

It will be obvious that the threads of the gears 29 and 30 must be right-handed or left-handed according to the direction in which those gears are required to rotate their respective attached members, that direction depending upon the differential relation of the gears. If, for example, the cam-gear 29 were to be provided with a less number of teeth than the gear 30, instead of having a greater number, as hereinbefore described, the cam 28 would be rotated somewhat faster than the tool-head 23, instead of slower, as hereinbefore described. In that case the outline of the flange 27 of the cam would have to be reversed from what is shown in Fig. 6 to adapt it to its relatively opposite direction of movement. Although the direction of rotation of the cam around the stay-bolt would remain the same, yet its direction of rotation with relation to the tool-head is reversed by this change in the ratio of its gearing, therefore requiring that the gear be attached to its cam by means of a right-hand thread instead of a left-hand one, as shown in the apparatus of Fig. 4.

Figure 7:
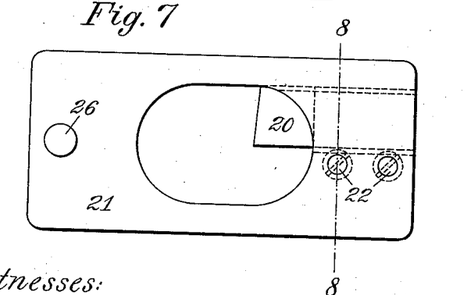
Fig. 7 is a side view of the tool-slide and of the tool clamped in position thereon.
Figure 8:
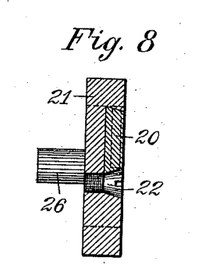
Fig. 8 is an end view in section taken on the line 8 8 of Fig. 7, showing one method of clamping the cutting-tool in position in the slide.

By employing the form of tool-slide shown in Fig. 7 I am enabled to mount it in the tool-head to greater advantage, having long bearing or sliding surfaces extending across the entire diameter of the head. By locating the cam-pin upon the side of the axis opposite to the location of the cutting-tool I am enabled to feed the tool with a drawing movement and to employ an open cam 27 instead of a closed cam, such as would be required for pushing the slide toward the center, as in the case of the cam 78 of Fig. 15. The latter arrangement may be employed where the diameter of the head is sufficiently great to allow of a sufficient length of sliding surface upon one side of its axis; but I prefer to employ the form shown in Figs. 6 and 7, thereby securing longer bearing-surfaces, a steadier movement of the slide, greater rigidity of the tool-head, and a preferable form of operating-cam; but inasmuch as the tool may be mounted upon a swinging arm similar to those shown in Figs. 8 and 9 of United States Patent No. 504,102, of August 29, 1893, to E. E. Claussen, I designate my tool-carrying device as a "tool-carrier" in some of the following claims, excepting those which relate to the specific construction shown in the drawings and described herein.

I am aware that the annular cam 34, which operates the tool-carriers of the above-mentioned Claussen patent, is journaled concentrically with the head upon a screw-thread upon which that cam is moved longitudinally toward the tool-head, that movement being utilized to move the tool-carriers; but that movement is not and cannot be continuous, its extent being limited by the circumstance that its rotation upon its screw-thread carries it altogether away from the tool-carriers, whereas the cam of my present invention may rotate repeatedly and continuously, remaining in the plane in which it engages to best advantage with the tool-carrier.

The resistance-plug P is preferably provided, as shown in Fig. 4, with a squared portion to receive a wrench, by means of which the plug may be securely screwed to place. The enlarged shoulder or collar of the plug by exerting its pressure and frictional contact at a radial distance from the center of the bolt much greater than that at which the tool acts is thereby enabled to more securely resist the unscrewing tendency of the stay-bolt. The face of the shoulder of the plug which engages with the plate may be cupped, so as to carry its engaging contact with the plate to the greatest possible radius from the center, or that engaging face may be roughened, so as to increase its frictional resistance to the unscrewing action of the stay-bolt.

The system of differential gearing herein shown may be modified in various ways which are known or which will suggest themselves to a mechanic skilled in this art. Among the many advantages gained by the use of this system in connection with my present apparatus is that I am thereby enabled to drive the feed-cam at a regular speed, as distinguished from those methods which employ an intermittently-moving star-wheel or similar device which feed the tool inwardly by a series of jerks at the successive rotations thereof. To insure the most effective and expeditious working, the tool should, as in the device herein shown, be fed with a constant and regular movement.

An armed spider or a hand-wheel may, if preferred, be substituted for the hub 24 and the handles 25 of Figs. 1, 2, and 4 when the apparatus is to be constantly used in one locality and when, therefore, convenience in transportation is not required. In many similar ways the several features may be modified or equivalent devices substituted without departing from the essential characteristics of this invention.

The pinions 31 and 50 are herein designated as "planetary" pinions, because of their capacity for revolution around their respective pairs of differential gears, the term "planetary" being well understood as applied to machine elements arranged for rotation on their own axes and also for revolution around some other element.

I claim as my invention—

1. A rotatable head and a rotatable cam journaled substantially concentric therewith, differential driving-gears for the head and the cam respectively, and a pinion mounted for planetary revolution around and operatively connecting the gears.

2. A rotatable head and a rotatable cam journaled substantially concentric therewith, differential driving-gears for the head and the cam, a revoluble arm journaled concentrically with the gears, and a pinion rotatably mounted on the arm and operatively connecting the gears.

3. A rotatable head, and a rotatable cam journaled substantially concentric therewith, a pair of differential gears fixed respectively upon the head and upon the cam, a pinion operatively connecting the gears, and a rotatable casing for inclosing the gears and the pinion, and upon which the latter is rotatably mounted.

4. In combination with a rotatable tool-head, a tool-carrier mounted thereon and movable transversely thereto, a rotatable cam for the tool-carrier mounted substantially concentric with the tool-head, and connected therewith by differential gears, and a pinion operatively connecting the gears and mounted for planetary revolution around them.

5. The combination of a rotating head, a tool-carrying slide mounted thereon and extending transversely across the head, with a cam engaging the slide at a point thereof diametrically and constantly opposite to the location of the tool for drawing the latter to its cut.

6. The combination of a rotatable head, a tool-carrying slide mounted thereon and extending diametrically across the head, provided with an aperture for the insertion of the work and provided with means for clamping the tool in position, with a cam engaging the slide at a portion thereof diametrically and constantly opposite to the location of the tool for feeding the latter to its cut with a drawing movement.

7. The combination of a rotatable head, a rotatable feed-cam journaled substantially concentric therewith, each provided with a pair of gears having a slightly-differing number of teeth, and a planetary pinion engaging with both of the gears, whereby differential relative movements are imparted to the head and its feed-cam, either by the rotation of the pinion on its axis, by its revolution around the gears, or by a combination of both movements.

8. A rotating head and a relatively rotatable cam journaled concentrically therewith, each provided with a threaded and shouldered portion for receiving its driving means, the direction of lead of the threaded portions being such as to cause their respective driving members to be tightened against the shoulders by the strain of rotating them in their respective directions.

9. A rotatable head, and a rotatable feed-cam journaled concentrically therewith, each being provided with threaded and shouldered extensions, a pair of driving-gears screwed upon the aforesaid extensions, the direction of lead of each of the threaded parts being such that the gears are screwed against their respective shoulders by the driving strains, substantially as described.

10. In a cutting-off device of the class specified, provided with differential gears, a casing therefor journaled concentrically with and inclosing the gears, provided with a pinion journaled and inclosed in the casing and engaging with the said gears, whereby the pinion is free to rotate upon its bearings in the casing, and to revolve with the casing concentrically with the gears.

11. In combination with an apparatus of the class specified, a manually-operated driving device therefor consisting of a hub attached to the rotating head of the apparatus and provided with oppositely-disposed removable handles, the hub being recessed to receive a suitable end-bearing collar provided with a removable hand-ring for retaining the end-bearing collar in position, substantially as described.

12. In combination with a rotating cutting-off device for boiler-plate stay-bolts, a threaded checking-piece for engaging with and checking or jamming the threads of the leading end of the stay-bolt in and against its coinciding threads of the boiler-plate, thereby resisting the tendency of the cutting-off device to rotate the bolt.

13. In combination with a rotating cutting-off device for stay-bolts, a plug for resisting the rotative tendency of the bolt under the cutting operation.

14. In combination with a rotating cutting-off device for stay-bolts, a plug P, having a threaded portion fitted to screw into the boiler-plate at the end of the stay-bolt, and having an enlarged friction-shoulder to bear against the surface of the plate, whereby the rotative tendency of the stay-bolt under the strain of the cutting-off operation is resisted.

JOS. B. RENSHAW.

Witnesses:
JENNIE NELLIS,
W. H. HONISS.